April 27, 1954  A. L. HOLCOMB  2,677,096
POWER SUPPLY APPARATUS
Filed April 4, 1952
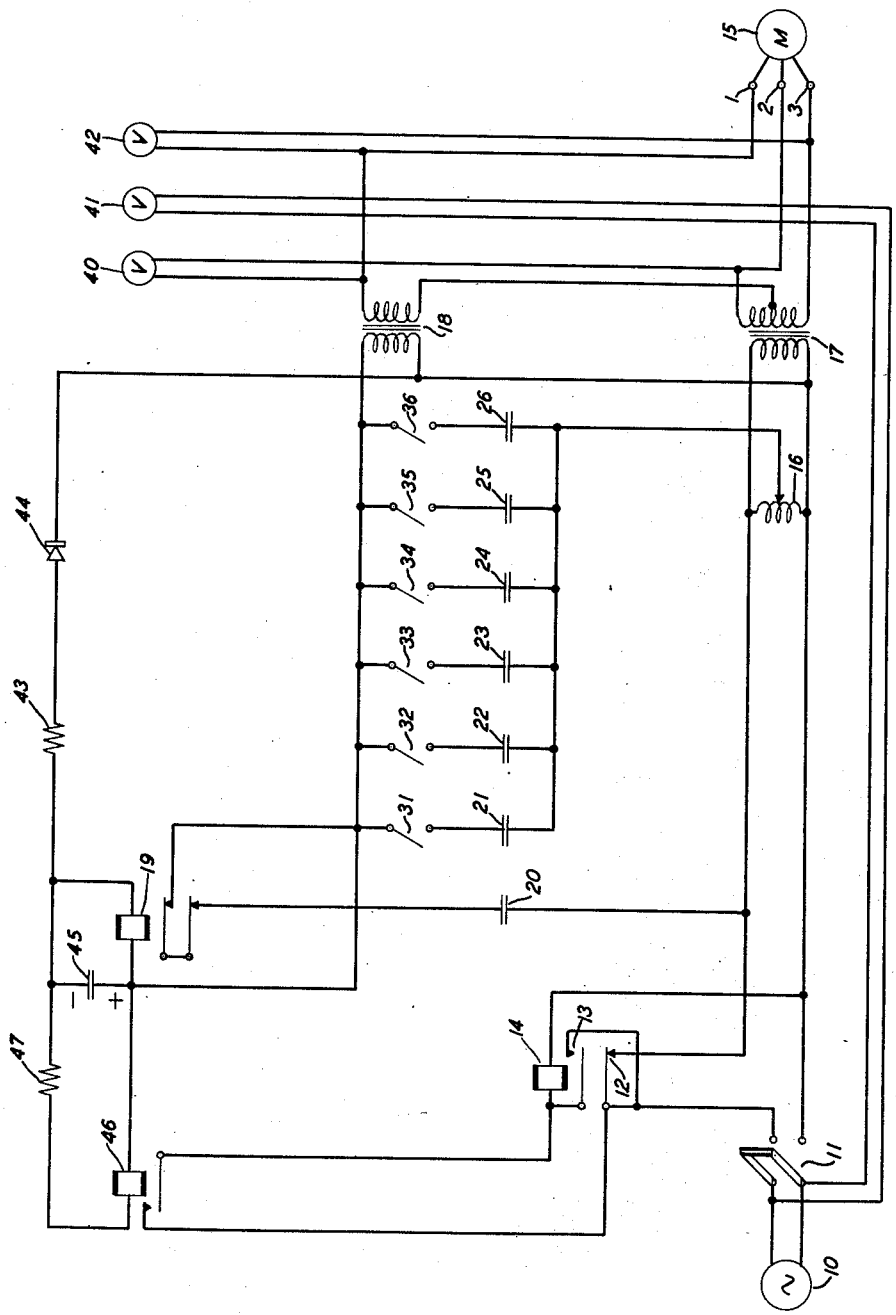
INVENTOR
A. L. HOLCOMB
BY
G. F. Heuerman
ATTORNEY

Patented Apr. 27, 1954

2,677,096

UNITED STATES PATENT OFFICE 2,677,096

POWER SUPPLY APPARATUS

Arthur L. Holcomb, Tarzana, Calif., assignor, by mesne assignments, to Westrex Corporation, a corporation of Delaware Application April 4, 1952, Serial No. 280,579

7 Claims. (Cl. 321—58)

This invention relates to power supply apparatus and particularly to apparatus for deriving, from a single-phase alternating-current source, three-phase alternating current suitable for energizing a three-phase synchronous motor for driving a motion-picture camera, for example.

An object of the invention is to provide improved apparatus for converting single-phase alternating current into three-phase alternating current.

Three-phase motors have several advantages over single-phase motors of equivalent power for use in driving motion-picture cameras, for example, such as, smaller size, lighter weight and quieter performance. Unfortunately, three-phase power lines are seldom available for location work outside of the motion-picture studio lot, whereas a single-phase source is usually available. Static apparatus for converting single-phase to three-phase alternating current can be designed and adjusted at the factory to give satisfactory performance when the apparatus is used for energizing a particular motor which drives a predetermined load. However, such apparatus, when used for energizing other motors or when used for energizing a motor which drives a load which changes, causes phase unbalance which can create operating noise or reduce the maximum power obtainable from the motor, thus destroying the very features which make the use of a three-phase motor desirable.

Since the power required for driving most cameras used in motion-picture production varies widely with temperature change, for example, it would be only by chance that a factory adjusted phase balance would give optimum results for any given location operating condition. If the maximum power condition of the motor were selected for phase balancing at the factory an unbalance and noisy operation would exist for all smaller loads, while adjustment for balance at a light load would result in a reduction of the maximum power obtainable.

Consideration of the problem indicates that the required phase shift from two conductors 180 degrees apart to three conductors displaced in phase by 120 degrees cannot be obtained on a non-rotating basis without the introduction of reactance in various forms in the conversion circuit. Since the electrical load is also reactive, it will combine with the circuit reactance to determine the phase shift obtained unless isolation can be introduced between the conversion circuit and the motor. Adequate isolation does not appear to be practical because of space, weight and efficiency factors and thus the motor reactance which varies from motor to motor and with load on any given motor must be considered as a component part of the conversion circuit. Therefore, a conversion circuit which will inherently maintain phase balance under the conditions here being considered does not appear to be practical.

In a specific embodiment of the invention, herein shown and described for the purpose of illustration, there is provided apparatus for deriving from a single-phase alternating-current supply source and for supplying to a load, such as a three-phase synchronous motor for driving a motion-picture camera, a substantially balanced three-phase alternating current. A phase multiplying transformer arrangement is used for converting the single-phase alternating-current into three-phase alternating current. Voltmeters are provided for indicating the voltages of each of the three output phases, thereby indicating phase balance or lack of phase balance.

The phase multiplying transformer arrangement comprises two transformers having their secondaries Scott-connected to the three-phase load. The primary of one of the transformers is directly connected to the single-phase source. There is impressed upon a circuit comprising the primary of the second transformer and capacitance of adjustable value, in series, a voltage of adjustable magnitude derived from the single-phase source. An additional capacitor is provided in the circuit during starting periods of the three-phase synchronous motor and means are provided for automatically disconnecting this additional capacitor when the voltage across the primary of the second transformer reaches a predetermined value, say, 100 volts. To prevent damage to the capacitance connected in circuit with the primary of the second transformer, means are provided for interrupting the supply of current from the single-phase source when the voltage across the primary of the second transformer reaches a certain predetermined value, say 300 volts.

The invention will be better understood by considering the following detailed description with reference to the accompanying drawing the single figure of which is a schematic view of a current supply apparatus embodying the invention.

Referring to the drawing, current from a single-phase alternating-current supply source 10 is supplied, through a switch 11 and through a normally closed contact 12 of a relay 14, to phase converting apparatus for supplying balanced three-phase alternating current to output terminals 1, 2 and 3 to which a load, such as a three-phase synchronous motor 15 for driving a motion-picture camera, not shown, for example, is connected. With the switch 11 closed, the terminals of the source 10 are directly connected to the terminals of a variable autotransformer 16 and to the terminals of the primary winding of a transformer 17. One terminal of the primary winding of a transformer 18 is connected to a terminal of the supply source 10. The other terminal of this primary winding is connected through the closed contacts of a relay 19, which are opened after the starting period of motor 15, as will later be explained, and through a 100-microfarad starting condenser 20 to the second terminal of the supply source. There are provided six oil-filled condensers 21, 22, 23, 24, 25 and 26 having capacitance values of 1, 2, 4, 8, 15 and 30 microfarads, respectively, for example. Any one or any combination of these condensers may be connected to the second terminal of the primary of transformer 18 by selectively closing the switches 31, 32, 33, 34, 35 and 36. A common terminal of condensers 21 to 26 is connected to the adjustable tap or brush of autotransformer 16. An adjustable voltage derived from the source by means of the autotransformer 16 is thus impressed across a path comprising the primary winding of transformer 18 and, in series therewith, one or more of the condensers 21 to 26 connected in parallel.

One of the terminals of the secondary winding of transformer 18 is connected to output terminal 1 and the second terminal of this secondary winding is connected to a mid-terminal of the secondary winding of transformer 17. The end terminals of the secondary of transformer 17 are connected to output terminals 2 and 3, respectively. The three-phase output terminals 1, 2 and 3 are connected to the terminals of the three-phase synchronous motor 15.

Three small voltmeters 40, 41 and 42 are provided for indicatting phase balance. Meter 41 is a 150-volt meter connected to the single-phase supply source 10. It indicates not only the voltage of the supply source but also provides an indication of the voltage across output terminals 2, 3 since this voltage is twice the line voltage of source 10 unless an abnormally high load should introduce an appreciable voltage drop across the resistance component of the impedance of transformer 17. Meters 40 and 42 are 300-volt meters connected across output terminals 1, 2 and 1, 3, respectively.

The voltage across the primary of transformer 18 is impressed upon a circuit comprising of relay 19, a resistor 43 and a rectifier 44, all in series, and a condenser 45 connected across the relay winding. When switch 11 is closed current is supplied to a current path comprising the primary of transformer 18 and condenser 20 in series. The impedance of a synchronous motor is very much less at the instant of starting than it is when running and, therefore, the capacitance required to approach resonance at line frequency is several times greater at the starting period than is required for running phase balance at even maximum load. Unless the high capacitance of condenser 20 is provided at the starting period, the output voltage impressed upon the motor at this time will be essentially single-phase and the motor will not start. After the initial starting period, when the voltage across the primary of transformer 18 reaches 100 volts, relay 19 operates to disconnect condenser 20 from the circuit.

There is connected across the winding of relay 19 a current path comprising the winding of a relay 46 and a resistor 47 in series. The relay 46 is designed to operate when the voltage across the primary of transformer 18 reaches 300 volts. The operation of relay 46 completes a circuit for energizing the relay 14 by current from source 10 when switch 11 is closed. Operation of relay 14 completes a lock-up circuit therefor through its upper contact 13 and opens its contact 12 to interrupt supply of current from source 10 to the primary circuits of transformers 17 and 18. This circuit arrangement is provided to protect the condensers 21 to 26 in case the load is disconnected while the switch 11 is closed. Opening the output circuit including the secondary of transformer 18 will allow the voltage in the resonant circuit including the primary of transformer 18 and one or more of the condensers 21 to 26 to rise well above the voltage rating of these condensers, which may be 330 volts, for example, unless the protection circuit, just described, is provided.

By selectively closing the switches 31 to 36, the capacitance in series with the primary of transformer 18 can be varied in steps of one microfarad over a range from 1 to 60 microfarads. A portion of the balanced three-phase inductive load of motor 15 is reflected through transformer 18 to the primary circuit where it is effectively resonated at the frequency of the source 10 by correctly selecting the capacitance in the circuit in response to the closure of one or more of the switches 31 to 36. The current in the primary of transformer 18 is thus shifted 90 degrees with respect to the current in the primary of transformer 17 since at resonance there will be no reactive component in the primary circuit of transformer 18 and the current therethrough will be in phase with the voltage while the current in the primary circuit of transformer 17 will lag the voltage approximately 90 degrees since it is predominantly inductive. The secondary voltages of transformers 17 and 18, respectively, are thus 90 degrees out of phase. Due to the secondaries of transformers 17 and 18 being Scott-connected, each of the three output phase voltages will be 120 degrees out of phase with respect to each of the two remaining phase voltages. If the secondary voltage of the transformer 17 is 230 volts and the voltage across the secondary of transformer 18 is adjusted by means of the variable autotransformer 16 to a value of 200 volts, for example, then each of the three phase output voltages will be substantially 230 volts. This three-phase balance will be upset by a change in either the phase or magnitude of the voltage across the secondary of transformer 18 and both these factors will vary with any change in impedance or inductance of the load. It is apparent, therefore, that in order to obtain a balanced three-phase output, both the capacitance in series with the primary of transformer 18 and the voltage across this primary must be adjusted to correct values.

It is desired to point out that voltage adjustment for transformer 18 could be obtained without introducing phase shift by means of series resistance in the resonant circuit or by resistance shunted across the primary of transformer 18, but either of these methods would result in serious power losses in the resistances. The use of the variable autotransformer 16 connected across the input line, as shown, is preferable since it functions as an efficient voltage divider and does not contribute a reactive component to the resonant circuit because the exciting current therefor is supplied by the input line.

The selection of the correct capacitance in the primary circuit of transformer 18 for balanced operation need be determined only once for any given motor and line frequency. Therefore, this information may be obtained in the shop before the camera driven by the motor goes on the set or location. Once obtained, the condenser values for different motors, or combinations of motors, may be tabulated and attached to the converter for ready reference.

To determine the correct value of capacitance, the motor is connected for operation, preferably driving a motion-picture camera or other normal load. About 25 microfarads should be initially connected in the circuit by means of switches 31 to 36 for a supply source 10 having a frequency of 60 cycles per second. The variable transformer 16 should initially have its variable tap or brush positioned at about its central position. After closing the switch 11, the voltmeters 40 and 42 should be observed and the brush of autotransformer 16 adjusted until like readings are obtained on these meters. If the reading on meter 40 and on meter 42 is higher than the pointer position (i. e., twice the indicated voltage) of the meter 41, then the capacitance of condensers 21 to 26 connected in the circuit should be reduced, and vice versa, and the voltages indicated by meters 40 and 42 should again be brought into balance by adjusting the brush of autotransformer 16. This operation should be repeated until all three meters have the same pointer position, that is, until the three output phase voltages are substantially equal. Having found the correct value of capacitance for the primary circuit of transformer 18, further adjustment for load changes may be made by varying the position of the brush of autotransformer 16 to make the voltage across output terminals 1, 2 as indicated by the meter 40 substantially the same as the voltage across output terminals 1, 3, as indicated by the meter 42, that is, the one meter may read a few volts more or less than the other. In either the initial or subsequent balancing, it will be found that the voltages indicated by meters 40 and 42 vary in the same direction with respect to each other in response to movement of the brush of the autotransformer 16 but the voltage indicated by meter 40 changes more rapidly than the voltage indicated by meter 42. The voltage indicated by meter 41 changes only in response to voltage changes of the supply source 10.

What is claimed is:

1. In combination, two transformers having a plurality of windings including primary windings to which currents are supplied from a single-phase alternating-current supply source and Scott-connected secondary windings connected to a three-phase reactive load which may vary, and means for impressing a substantially balanced three-phase voltage upon said load, said means comprising adjustable means for changing the relative phase of the currents supplied from said source to said primary windings, respectively, and means for changing the voltage impressed upon one of said primary windings with respect to the voltage impressed upon the other of said primary windings.

2. In combination, two transformers having a plurality of windings including primary windings to which currents are supplied from a single-phase alternating-current supply source and Scott-connected secondary windings for supplying three-phase current to a three-phase reactive load which may vary, means connected to said transformers for indicating the condition of balance of the three voltages impressed upon said load, and means for impressing a substantially balanced three-phase voltage upon said load comprising means which may be adjusted to vary the relative phase of the currents supplied from said source to said primary windings, respectively, thereby bringing the phase of the current supplied to one of said primary windings into quadrature with the current supplied to the other primary winding and means for varying the voltage across one of said primary windings with respect to the voltage across the other of said primary windings.

3. In combination, a first and a second transformer each having a primary winding and a secondary winding, said secondary windings being Scott-connected to a substantially balanced three-phase inductive load, means for supplying current from a source of single-phase alternating current directly to the primary of said first transformer, a plurality of condensers, a current path comprising the primary of said second transformer, means for connecting desired condensers of said plurality of condensers in parallel with respect to each other and in series with the primary of said second transformer in said current path, adjustable means for deriving a desired voltage from said single-phase current source, and means for impressing said derived voltage upon said current path.

4. In combination, a first and a second transformer each having a primary and a secondary winding, means for connecting the terminals of the secondary of said first transformer to a first output terminal and to a mid-terminal of the secondary of said second transformer, respectively, means for connecting the end terminals of the secondary of said second transformer to a second and a third output terminal respectively, said output terminals being connected to a substantially balanced three-phase inductive load, an autotransformer having an adjustable tap, means for supplying current from a single-phase alternating-current supply source to said autotransformer and to the primary of said second transformer, a plurality of condensers having a common terminal connected to the adjustable tap of said autotransformer, means for connecting one terminal of said supply source to a first terminal of the primary of said first transformer, switching means for selectively connecting the second terminal of the primary of said first transformer to the remaining terminals of desired condensers of said plurality of condensers, and three voltmeters connected to said supply source, to said first and second output terminals and to said first and third output terminals, respectively.

5. A combination in accordance with claim 4 in which there is provided an additional condenser, a circuit connecting said additional condenser in series with the primary of said first transformer and said supply source, and means for opening said circuit in response to an increase of the voltage across the primary of said first transformer to a predetermined value.

6. A combination in accordance with claim 5 in which there is provided means responsive to a voltage increase across the primary of said first transformer to an abnormally high value larger than said predetermined value for interrupting the supply of current from said supply source to the primaries of said first and second transformers.

7. In combination, two transformers having Scott-connected secondaries connected to a substantially balanced three-phase inductive load, each of said transformers having a primary winding, means for connecting one of said primary windings to a single-phase alternating-current supply source, a current path comprising the other of said primary windings, means for deriving from said supply source a single-phase alternating voltage of adjustable magnitude, means for impressing said derived voltage upon said current path, and adjustable capacitive means for bringing said current path into resonance with the frequency of said supply source.

References Cited in the file of this patent

UNITED STATES PATENTS

| Number | Name | Date |
|---|---|---|
| 1,232,863 | Simmon et al. | July 10, 1917 |
| 1,296,287 | Hellmund | Mar. 4, 1919 |
| 1,843,521 | Smith | Feb. 2, 1932 |
| 1,848,866 | Baker | Mar. 8, 1932 |
| 1,973,010 | Morrison | Sept. 11, 1934 |